Patented May 13, 1930

1,758,385

UNITED STATES PATENT OFFICE

WERNER ZERWECK, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

AZO DYESTUFFS AND PROCESS OF MAKING SAME

No Drawing. Original application filed November 15, 1926, Serial No. 148,620, and in Germany November 17, 1925. Divided and this application filed October 21, 1927. Serial No. 227,858.

This application is a division of my application Serial No. 148,620, filed November 15, 1926.

My invention relates to new azodyestuffs and a process of making same, said dyestuffs having probably the general formula:

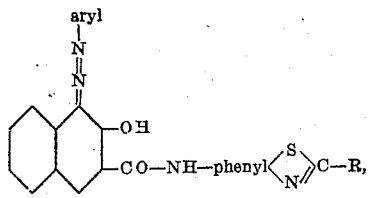

in which formula the phenylresidue may be further substituted in addition to the aminogroup and R means alkyl or the residue:

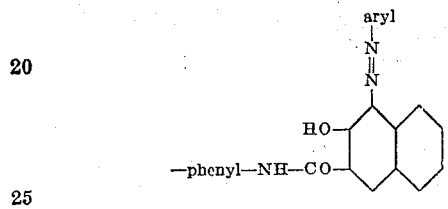

The new dyestuffs may be obtained by combining any diazocompound not containing a sulfonic group with a derivative of 2.3-hydroxynaphthoic acid of the general formula:

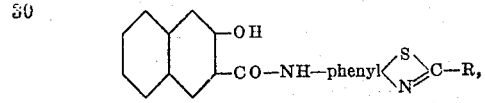

in which formula the phenylresidue may be further substituted in addition to the aminogroup and R means alkyl or the residue:

—phenyl—NH—CO—<svg/>HO—<svg/>

These derivatives of 2.3-hydroxynaphthoic acid have not been described hitherto in the literature. They are easily obtainable by condensing, according to U. S. A. Patent 1,101,111, one or two molecular proportions of 2.3-hydroxynaphthoic acid with the corresponding aromatic mono- or diamines containing the thiazolic group in their molecule. The aminothiazolic compounds may be prepared by allowing acid chlorides or anhydrides to act on ortho-amino-arylmercaptanes containing an acylamino in the arylresidue, and splitting off the acylresidue afterwards, or by allowing nitro-substituted acid chlorides or anhydrides to act on ortho-amino-arylmercaptanes and reducing the nitrogroup afterwards.

The aforesaid methods for preparing 2.3-hydroxynaphthoylaminothiazol compounds may be illustrated by the following scheme of equations:

1:

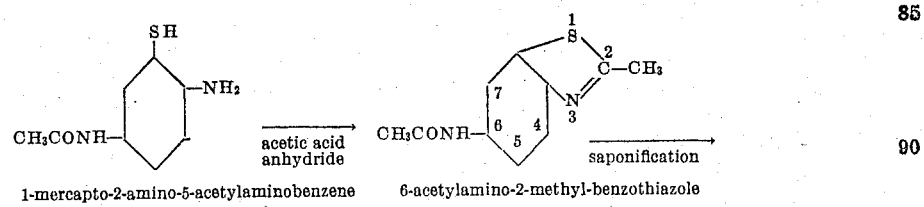

1-mercapto-2-amino-5-acetylaminobenzene    6-acetylamino-2-methyl-benzothiazole

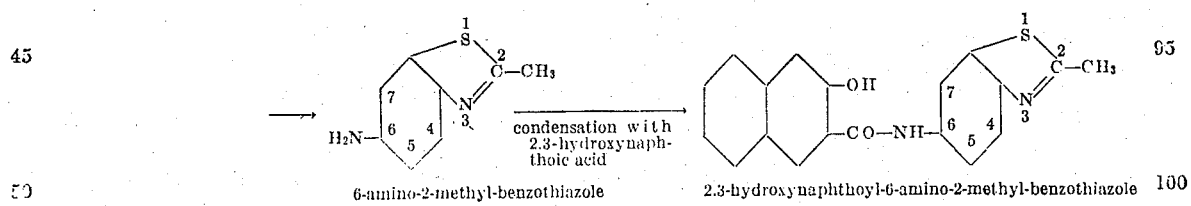

6-amino-2-methyl-benzothiazole    2.3-hydroxynaphthoyl-6-amino-2-methyl-benzothiazole

2:

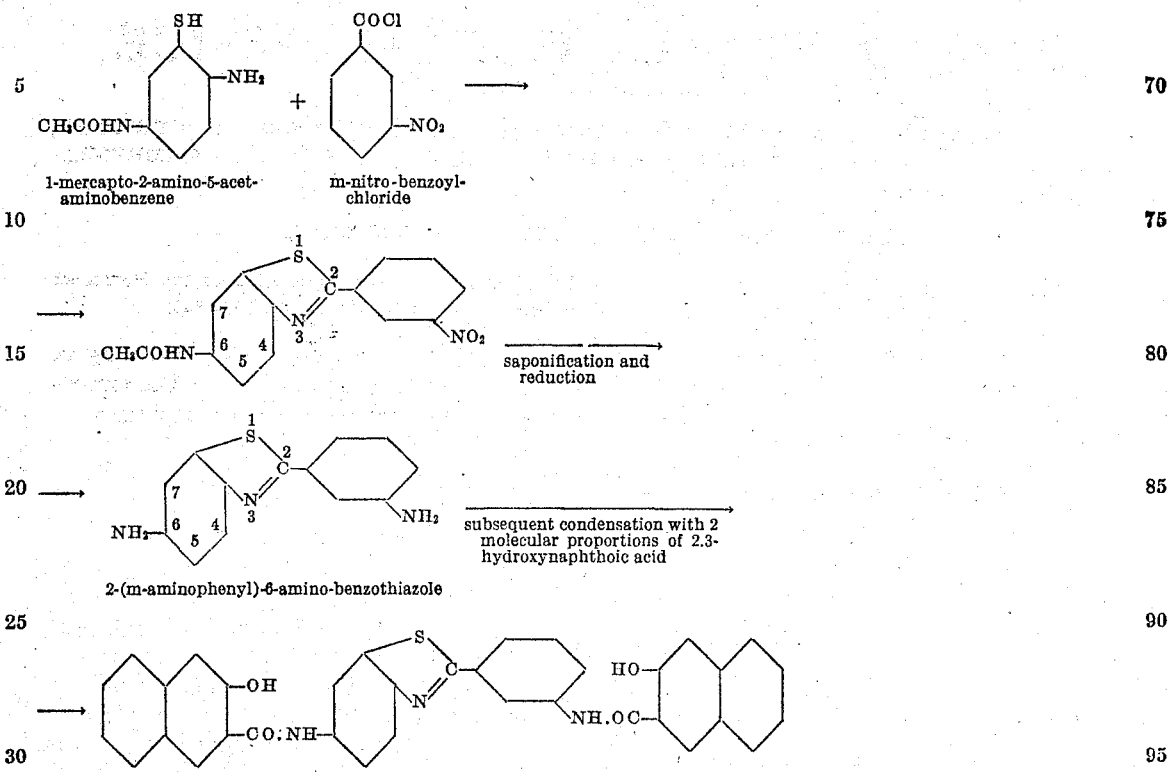

1-mercapto-2-amino-5-acetaminobenzene m-nitro-benzoyl-chloride 2-(m-aminophenyl)-6-amino-benzothiazole saponification and reduction subsequent condensation with 2 molecular proportions of 2.3-hydroxynaphthoic acid The new dyestuffs yield valuable color lakes when mixed with the usual substrata. They are particularly adapted for being produced on the vegetable fibre, because the derivatives of 2.3-hydroxynaphthoic acid of the above-said formula are distinguished by an especial affinity to the vegetable fibre. It is therefore not necessary to dehydrate the padded dyegoods as far as possible by squeezing, pressing or centrifuging prior to developing, it being sufficient to treat the padded dyegoods in moist condition with any usual rinsing solution. The dyeings, obtained by developing with various diazosolutions, range from yellowish to black and possess a remarkable brightness and intensity and, owing to the substantive character of the used azocomponent, an especial fastness to rubbing.

In order to further illustrate my invention the following examples are given, the parts being by weight and all temperatures in centigrade degrees, it being understood that my invention is not limited to the particular products or reaction conditions mentioned therein.

*Example.*—The cotton yarn is impregnated with a solution containing 10 gm. of the 2.3-hydroxynaphthoyl-compound of 2-methyl-6-amino-benzothiazol, 17 cc. of caustic soda solution of 34° Bé. and 25 cc. of Turkey red oil per litre. The goods are then well wrung out, rinsed, and, without being dried, developed with a diazosolution neutralized with a solution of sodium acetate and containing 2 gm. of meta-nitro-orthoanisidine per litre.

The dyestuff, thus produced on the fibre, having probably the formula:

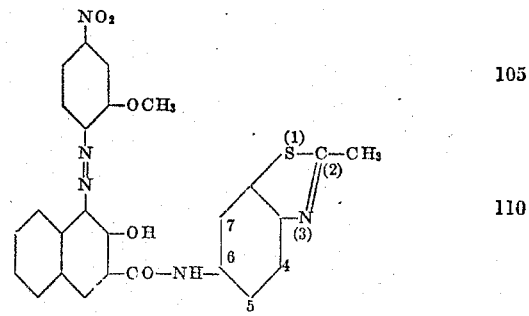

dyes a brilliant bluish red of an excellent fastness.

The aforesaid 2-methyl-6-amino-benzothiazol may, for instance, be prepared by allowing disulfur dichloride to act on para-amino-acetanilide (cf. British Patent 17417/14), treating the compound thus obtained with an alkali, whereby the thiazthionium ring is split and the corresponding ortho-amino-arylmercaptane is obtained, forming then the thiazolic ring by treating it with acetic acid anhydride and finally saponifying the acetyl group. The amino compound thus obtained is easily soluble in dilute hydrochloric acid and is separated unchanged by adding an alkaline solution to this acid solution.

The production of 2-methyl-6-amino-benzothiazole may be illustrated in the following manner:

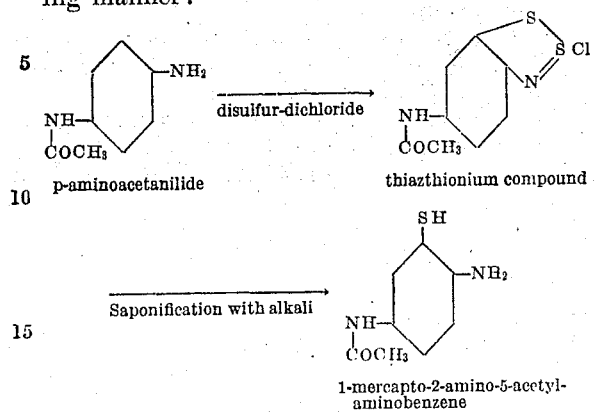

p-aminoacetanilide thiazthionium compound 1-mercapto-2-amino-5-acetyl-aminobenzene The subsequent conversion into the aminothiazole compound is above described by the scheme of equations 1.

The new dyestuffs may also be produced by printing a diazosolution on a padded material according to the usual method or also according to the nitrosamine printing process.

In the same manner the process may be conducted with other diazo-, tetrazo- or polyazo bodies and the 2.3-hydroxy-naphthoyl-compounds of other thiazolic derivatives.

The following table gives the shades obtained on cotton material by producing some other dyestuffs according to my process:

in which formula the phenyl residue in addition to the amino group may be further substituted and R means alkyl or the residue:

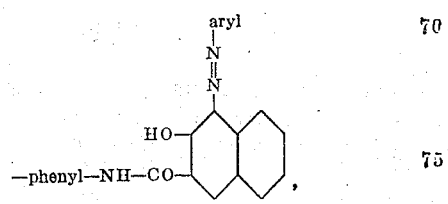

which dyestuffs yield upon reduction with stannous chloride an arylamine and the corresponding derivative of the 1-amino-2-hydroxy-naphthalene-3-carboxyamide, which dyestuffs are adapted for the production of valuable color lakes, when mixed with the usual substrata, and yield when produced on the vegetable fibre dyeings of a remarkable brightness and intensity and an excellent fastness, especially to rubbing.

2. The process of making new azodyestuffs which comprises combining any aromatic diazocompound, not containing a sulfonic group, with a derivative of 2.3-hydroxynaphthoic-acid of the general formula:

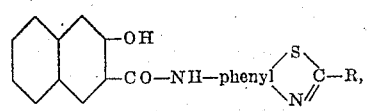

| Two molecular proportions of the diazocompound or one molecular proportion of the tetrazocompound of: | Combined with the di-2.3-hydroxynaphthoylderivatives of: | Shades |
|---|---|---|
| Meta-nitro-para-toluidine | 2-(p-aminophenyl)-6-amino-benzothiazole of the formula: 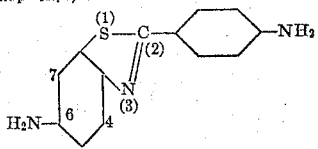 | Brownish red |
| p-chloro-o-toluidine | Do. | Red |
| p-p'-diaminodiphenylamine | Do. | Black |
| o-phenetol-α-naphthylamine | Do. | Reddish black |
| m-nitro-p-toluidine | 2-(m-aminophenyl)-6-aminobenzothiazol | Bluish red |
| p-chloro-o-toluidine | Do. | Scarlet red |
| p-p'-diamino-diphenylamine | Do. | Bluish black |
| o-phenetol-α-naphthylamine | Do. | Violet black |

| One molecular proportion of the diazocompound of: | Combined with the mono-2.3-hydroxy-naphthoylderivative of: | Shades |
|---|---|---|
| m-nitro-o-anisidine | 2-methyl-6-aminobenzothiazol | Bluish red |
| p-chloro-o-toluidine | Do. | Brilliant red |

I claim:

1. As new compounds the azodyestuffs having probably the general formula:

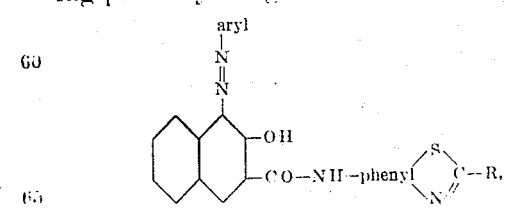

in which formula the phenyl residue in addition to the amino group may be further substituted and R means alkyl or the residue:

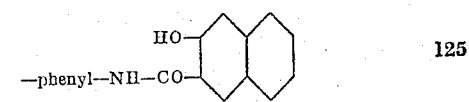

3. The process of producing new azodyestuffs on the vegetable fibre which comprises impregnating the fibre with a derivative of 2.3-hydroxynaphthoic acid of the general formula:

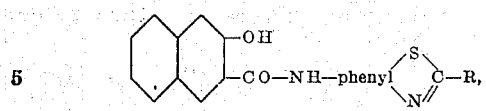

in which formula the phenylresidue in addition to the amino group may be further substituted, R means alkyl or the residue:

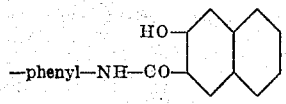

and developing then with any aromatic diazocompound not containing a sulfonic group.

4. Materials dyed with the new azodyestuffs of claim 1, said dyestuffs being produced on the fibre of the material.

5. As new compounds the azodyestuffs having probably the general formula:

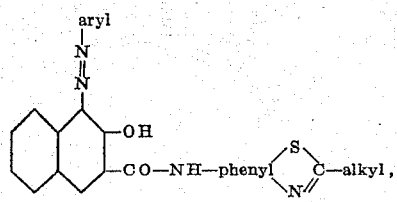

in which formula the phenyl residue in addition to the amino-group may be further substituted, which dyestuffs yield upon reduction with stannous chloride an arylamine and the corresponding derivative of the 1-amino-2 - hydroxynaphthalene - 3 - carboxyamide, which dyestuffs are adapted for the production of valuable color lakes when mixed with the usual substrata, and yield when produced on the vegetable fibre dyeings of a remarkable brightness and intensity and an excellent fastness, especially to rubbing.

6. The process of making new azodyestuffs which comprises combining any aromatic diazocompound not containing a sulfonic group, with a derivative of 2.3-hydroxynaphthoic acid of the general formula:

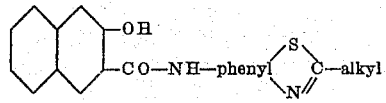

in which formula the phenyl residue in addition to the amino-group may be further substituted.

7. The process of producing new azo dyestuffs on the vegetable fibre which comprises impregnating the fiber with a derivative of 2.3-hydroxynaphthoic acid of the general formula:

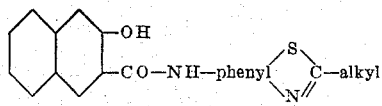

in which formula the phenyl residue in addition to the amino-group may be further substituted, and developing them with any aromatic diazocompound not containing a sulfonic group.

8. Materials dyed with the new azodyestuffs of claim 5, said dyestuffs being produced on the fibre of the material.

In witness whereof I have hereunto signed my name this 7th day of October, 1927.

WERNER ZERWECK.